United States Patent
Steinhauser et al.

(10) Patent No.: US 9,476,503 B2
(45) Date of Patent: Oct. 25, 2016

(54) METHOD FOR OPERATING AN AUTOMATIC TRANSMISSION

(71) Applicant: ZF Friedrichshafen AG, Friedrichshafen (DE)

(72) Inventors: Klaus Steinhauser, Kressbronn (DE); Valentine Vincent, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 14/412,835

(22) PCT Filed: Jun. 4, 2013

(86) PCT No.: PCT/EP2013/061417
§ 371 (c)(1),
(2) Date: Jan. 5, 2015

(87) PCT Pub. No.: WO2014/005775
PCT Pub. Date: Jan. 9, 2014

(65) Prior Publication Data
US 2015/0167838 A1    Jun. 18, 2015

(30) Foreign Application Priority Data
Jul. 5, 2012 (DE) .................. 10 2012 211 673

(51) Int. Cl.
*F16H 3/44* (2006.01)
*F16H 61/08* (2006.01)
(Continued)

(52) U.S. Cl.
CPC .......... *F16H 61/08* (2013.01); *F16H 61/0403* (2013.01); *F16H 61/686* (2013.01); *F16H 2061/0474* (2013.01);
(Continued)

(58) Field of Classification Search
CPC .. F16H 61/08; F16H 61/868; F16H 61/0403; F16H 2200/0065; F16H 2200/2046; F16H 2200/0082; F16H 2061/0474; F16H 2200/2094; F16H 2200/2064
See application file for complete search history.

(56) References Cited

U.S. PATENT DOCUMENTS 6,508,742 B2   1/2003   Popp et al.
8,398,522 B2   3/2013   Bauknecht et al.
(Continued)

FOREIGN PATENT DOCUMENTS

DE   10 2010 007 886 A1   8/2011
WO   WO 2012/079845 A1    6/2012

OTHER PUBLICATIONS

German Patent Office Search Report, Apr. 9, 2013.
(Continued)

*Primary Examiner* — David J Hlavka
(74) *Attorney, Agent, or Firm* — Dority & Manning, P.A.

(57) ABSTRACT

In a method for operating an automatic transmission having multiple frictional-locking shifting elements and at least one positive-locking shifting element, for the representation of a transmission ratio stage, at least three shifting elements are closed. For a shifting process between two specified transmission ratio stages, at least two shifting elements are opened and at least two shifting elements, including at least one positive-locking shifting element and at least one frictional-locking shifting element, are closed. In the chronological sequence of the shifting process, the closing of the positive-locking shifting element takes place only after all frictional-locking shifting elements are closed.

7 Claims, 3 Drawing Sheets

|     | A | B | C | D | E | F |
|-----|---|---|---|---|---|---|
| "1" | X |   |   | X |   | X |
| "2" | X |   | X |   |   | X |
| "3" | X | X |   |   |   | X |
| "4" | X |   |   |   | X | X |
| "5" | X | X |   |   | X |   |
| "6" | X |   | X |   | X |   |
| "7" | X |   |   | X | X |   |
| "8" |   |   | X | X | X |   |
| "9" |   | X |   | X | X |   |
| "R" |   | X |   | X |   | X |

(51) Int. Cl.
*F16H 61/04* (2006.01)
*F16H 61/686* (2006.01)

(52) U.S. Cl.
CPC ........... *F16H 2200/0065* (2013.01); *F16H 2200/0082* (2013.01); *F16H 2200/2046* (2013.01); *F16H 2200/2064* (2013.01); *F16H 2200/2094* (2013.01)

(56) References Cited

U.S. PATENT DOCUMENTS

| | | | | |
|---|---|---|---|---|
| 8,652,004 | B2* | 2/2014 | Herbeth | B60W 10/06 475/116 |
| 8,708,862 | B2* | 4/2014 | Scherer | F16H 3/62 475/282 |
| 8,915,160 | B2 | 12/2014 | Guggolz et al. | |
| 9,002,603 | B2* | 4/2015 | Arnold | F16H 61/12 701/58 |
| 9,080,648 | B2* | 7/2015 | Ziemer | F16H 3/44 |
| 9,086,146 | B2* | 7/2015 | Arnold | F16H 61/16 |
| 9,182,013 | B2* | 11/2015 | Gumpoltsberger | F16H 3/66 |
| 9,188,219 | B2* | 11/2015 | Arnold | F16H 61/0213 |
| 2011/0263382 | A1 | 10/2011 | Arnold et al. | |
| 2011/0284335 | A1 | 11/2011 | Arnold et al. | |
| 2012/0135838 | A1 | 5/2012 | Cuppers et al. | |
| 2013/0035206 | A1 | 2/2013 | Herbeth et al. | |

OTHER PUBLICATIONS

PCT Search Report, Aug. 14, 2013.

* cited by examiner

|   | A | B | C | D | E | F |
|---|---|---|---|---|---|---|
| "1" | X |   |   | X |   | X |
| "2" | X |   | X |   |   | X |
| "3" | X | X |   |   |   | X |
| "4" | X |   |   |   | X | X |
| "5" | X | X |   |   | X |   |
| "6" | X |   | X |   | X |   |
| "7" | X |   |   | X | X |   |
| "8" |   |   | X | X | X |   |
| "9" |   | X |   | X | X |   |
| "R" |   | X |   | X |   | X |

METHOD FOR OPERATING AN AUTOMATIC TRANSMISSION

FIELD OF THE INVENTION

The invention relates to a method for operating an automatic transmission.

BACKGROUND

For the representation of a transmission ratio stage of an automatic transmission, several elements of a planetary transmission are connected to the housing or to each other in a torque-proof manner, which takes place by means of shifting elements formed as brakes or couplings. Thus, a different combination of elements is closed with different transmission ratio stages. A gearshift, which is also known as a change in the transmission ratio stage or below only as a shift, takes place in a specified shifting time through a switching off or opening, or switching on or closing, of specified shifting elements. The closing of the shifting elements takes place by hydraulic pressure or a different force effect. In the case of a frictional-locking hydraulic shifting element to be switched on, for reasons of shifting comfort, the transfer capacity of the shifting element correspondingly increases through a pressure increasing with a specified function over time, or decreases in the operation of the slip of the frictional-locking shifting element. With a frictional-locking shifting element, one speaks of a closed state if the shifting element halves are connected to each other in a torque-proof manner. With a frictional-locking shifting element to be switched off, the pressure and thus the transfer capacity decrease in a corresponding chronological progression. In the open state of a frictional-locking shifting element, the shifting element halves are separated from each other, such that, except for a drag torque, a torque sufficient for the propulsion of the vehicle can be transferred.

For an automatic transmission with hydraulic frictional-locking elements, the shifting element to be switched on (and thus to be closed) is initially prepared (i.e., filled) for the assumption of torque. Likewise, preparatory measures for the switching off shifting element, such as a reduction of the pressure to a level at which there is a defined slip-afflicted transfer capacity, may also be taken. Typically, the preparatory filling process of a shifting element is split into a rapid filling phase and a filling adjustment phase. During the rapid filling phase, the shifting element is filled with oil, whereas, the piston is applied with low pressure in the filling adjustment phase, such that the clearance in the shifting element (for example, formed as a multi-disk coupling) is raised, but a sufficient torque for the drive or the bracing of the automatic transmission is still not transferable. Through the preparation of the switching on of the shifting elements and the preparation of the switching off of the shifting elements, delay periods arise, in which the change to the rotational speed does not continuously run to the next transmission ratio stage, but remains at the synchronous rotational speed of the previous shift. This results in a perceptible stage in the change to the rotational speed, which also has negative effects on shifting comfort.

The constantly increasing requirements on the functionality of automatic transmissions through the demand for more spontaneity, the ever-growing number of transmission ratio stages or gears to be switched on, the consumption-optimized design of automatic transmissions with the larger driving-mode shares in the high gears and the number of downshifts to be carried out, which has grown with the number of gears, and for the braking of the vehicle up to a stop require that the gears of an automatic transmission should be shifted one after the other with greater and greater speed and frequency.

For example, upon braking processes, depending on the difference in speed to be cut down, it may be necessary to undertake a change of transmission ratio stages over several transmission ratio stages, whereas, at the beginning of the braking process, the known target transmission ratio stage is not yet known based on the output transmission ratio stage, such that this cannot be directly engaged. In addition, if even for the target transmission ratio stage, but not for all transmission ratio stages, it is possible to shift directly in it, it is necessary to open only one shifting element in a shifting process and to close another shifting element, in order to avoid interruptions in the pulling force.

DE 100 35 479 A1 shows a method for operating an automatic transmission with frictional-locking shifting elements, with which shifts that are consecutive in the same shifting direction, i.e., either multiple upshifts or multiple downshifts one after the other, do not take place as a multiple shift, but are interlaced within each other. In this context, a multiple shift is understood to be a multitude of successive shifts, whereas the next shifting process starts only after the preceding shift is completed and the corresponding transmission ratio stage is engaged. An interlacing of shifts is understood such that the subsequent shifting process is already prepared during the first shifting process. The preparation of a shift is understood such that the shifting elements to the switched on upon the next shifting process are pre-filled, and are thus closed immediately after reaching a synchronous rotational speed of the first shift. In particular, the interlaced shift is the case of a change of transmission ratio stages, with which more than one shifting element is open, and thus more than one shifting element is closed.

Through the interlaced shift, it is possible to undertake one shift over multiple transmission ratio stages without an interim stage being engaged, as with the multiple shift. With the interlaced shift, the shifting time from the disengaging of the output transmission ratio stage up to the engaged condition of the last transmission ratio stage is significantly shortened compared to the multiple shift. It is also possible to start a shift from an output transmission ratio stage into a first target transmission ratio stage and, in the case of the requirement of a second target transmission ratio stage in the same direction through the prepared shifting elements, to have the option of spontaneously engaging the second target transmission ratio stage with a short shifting time. In addition, the interlaced shift can also be cut off, and the first target transmission ratio stage can be engaged, if this is necessary.

It is known that frictional-locking shifting elements selected with the goal of improving the efficiency of automatic transmissions are replaced with positive-locking shifting elements. Advantageously, the drag torque of the positive-locking shifting elements in their open state is significantly less than the drag torque of an open frictional-locking shifting element. For this reason, with a known transmission, certain frictional-locking shifting elements are replaced with positive-locking shifting elements. DE 10 2008 000 429 A1 shows such an automatic transmission, which includes four frictional-locking shifting elements and two positive-locking shifting elements. Thereby, only such shifting elements that are disengaged upon upshifts may be formed to be positive-locking; i.e., the engagement of the positive-locking shifting element takes place only for downshifts. Thereby, a disengagement of the positive-locking shifting element is understood to be a process for which the shifting element halves are separated. At the beginning of the process, the shifting element is still closed and, at its end, the shifting element is open, by which a transfer of torque can no longer take place. As an analogy to this, the insertion or engagement of a positive-locking shifting element is understood as a process with which a positive-locking shifting element is, starting from an open state, closed.

If, for an interlaced shift, a shifting element to be switched on is formed to be positive-locking, for example as a claw coupling, which is to be switched on as early as the first change to the transmission ratio, according to the known method, this is to be closed at the point in time at which the original frictional-locking shifting element takes over the transfer of torque. Thereafter, an additional frictional-locking shifting element to be switched on, which was prepared for the first shift, is closed.

In order to be able to engage a positive-locking shifting element, the differential rotational speed of the shifting element halves must not exceed a specified maximum value, since damages to the form elements, such as claws or gear teeth, will otherwise arise. It is also possible that the claws of the two halves of the coupling do not fully engage in each other. If the differential rotational speed is too small, or the rotational speed of the two halves of the coupling are the same, the claw gear teeth during the engagement process can occupy a tooth-to-tooth position, which makes an engagement of the gear teeth in each other impossible. For this reason, it is necessary to, using the knowledge of the input rotational speed and output rotational speed of the automatic transmission, determine the differential rotational speed of the shifting element halves and, through measures such as the short-term influencing of the engine rotational speed or the braking of one half of the shifting element, reduce it through the friction torque of a frictional-locking shifting element into the desired range. The rotational speed of the turbine wheel of the hydrodynamic converter, and not the engine rotational speed, is thereby used as the input rotational speed, since differences between the engine rotational speed and the transmission input shaft may occur due to a possible slip of the hydrodynamic torque converter.

However, with a known interlacing of the shifts, it is disadvantageous that this determination of the differential rotational speed is not clearly possible, since, simply in view of the subsequent shift, a frictional-locking shifting element to be switched off was, in its transfer capacity, reduced at least to one slip-afflicted area, and a frictional-locking shifting element to be switched on is still not fully closed. Thereby, upon an attempt to engage the positive-locking shifting element, in addition to the damage already mentioned, torque shocks may arise if the rotational speed difference is too large. This results in torque shocks and thus poor shifting comfort.

SUMMARY OF THE INVENTION

A task underlying the invention is to specify a method that, for a shift for which more than one shifting element is to be opened or is to be closed, in particular an interlaced shift, enables the safe and comfortable engagement of a positive-locking shifting element, without extending the duration of the shift. In particular, a secure calculation of the differential rotational speed of the shifting element halves of the positive-locking shifting element is to be ensured with the method. Additional objects and advantages of the invention will be set forth in part in the following description, or may be obvious from the description, or may be learned through practice of the invention.

Accordingly, a method for operating an automatic transmission, which comprises multiple frictional-locking shifting elements and at least one positive-locking shifting element, is specified. For the representation of a transmission ratio stage, and thus a power flow through the automatic transmission, at least three shifting elements are closed, whereas, for a shifting process between two specified transmission ratio stages, at least two shifting elements are opened and at least two shifting elements, including at least one positive-locking shifting element and at least one frictional-locking shifting element, are closed. In accordance with the invention, in the chronological sequence of the shifting process, the closing of the positive-locking shifting element takes place only after all frictional-locking shifting elements are closed. Since, for a comfortable closing of the positive-locking shifting element that is free of wear and torque shocks, a differential rotational speed of the halves of the coupling must be below a specified permissible amount, this differential rotational speed is to be calculated prior to the closing of the positive-locking shifting element and is to be reduced if the amount is exceeded. Since the differential rotational speed is calculated by means of knowing the input rotational speed and the output rotational speed of the transmission, except for the positive-locking shifting element to be switched on, no additional shifting element that is necessary for the presentation of the desired transmission ratio stage may feature a differential rotational speed.

The shifting process preferably comprises a downshift.

In a particularly advantageous arrangement of the method, the change to the transmission ratio stages takes place in two consecutive downshifts, which are able to be executed in an interlaced manner such that, upon the first downshift, at least one shifting element required for the subsequent second downshift is prepared during the current first downshift in such a manner that, upon reaching a synchronization point of the current first downshift, the immediate conducting of the subsequent second downshift is possible. Thereby, the automatic transmission features at least six shifting elements, of which a maximum of three shifting elements are closed for the transfer of torque or power in one forward gear or in one reverse gear. Two consecutive downshifts are able to be executed through the activation of at least five shifting elements in such a manner that, upon both the first and the second downshift, one shifting element is to be opened and one shifting element is to be closed, in order to shift from the respective output transmission ratio stage to the respective target transmission ratio stage. Thereby, if the first and second downshifts are interlaced, one first and one second shifting element are to be opened, and one third and one fourth shifting element are to be closed, in order to move from the output transmission ratio stage of the first downshift to the target transmission ratio stage of the second downshift. Thereby, the third shifting element is formed to be positive-locking, and would already be closed for the presentation of the target transmission ratio stage of the first downshift. The fourth shifting element is formed to be frictional-locking, and during the first downshift is prepared for switching on upon the second downshift, whereas, upon the engagement of the target transmission ratio stage of the second downshift, the prepared frictional-locking fourth shifting element is initially closed, and the frictional-locking third shifting element is subsequently switched on after the differential rotational speed is determined from the halves of its shifting elements and (if necessary) guided under a specified permissible value.

In a continuation of the arrangement, the rotational speed difference is guided under the specified value by a positive engine control intervention taking place. Thereby, a positive engine control intervention is understood to be the increasing of the engine rotational speed of the drive motor of the vehicle.

In this context, it is possible that, between a point in time at which the third shifting element is closed as the last frictional-locking shifting element and a point in time at which the closing process of the positive-locking shifting element begins, there is a specified time interval, which is selected with such a large size that, during its length of time, a rotational speed difference between the shifting element halves of the positive-locking shifting element can be determined, and the rotational speed difference can be guided under a specified value.

Preferably, at least two adjacent transmission ratio stages lie between the first specified transmission ratio stage and the second specified transmission ratio stage.

It is particularly advantageous that, when changing between two successive transmission ratio stages, only one shifting element is opened and one other shifting element is closed. This ensures that, during the shifting process, an interruption in the pulling force does not arise.

BRIEF DESCRIPTION OF THE DRAWINGS

Several embodiments of the invention are shown in the drawings and are described in detail below.

The following is shown.

DETAILED DESCRIPTION

Figures 1A, 1B:
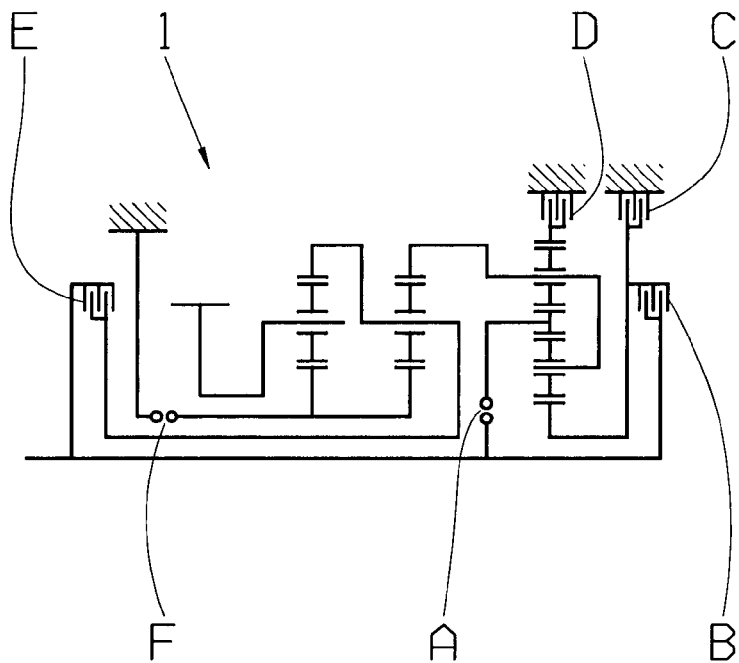
FIG. 1a a schematic representation of an automatic transmission with gear sets and shifting elements.
FIG. 1b the shifting elements to be closed for the representation of the different transmission ratio stages, in tabular form.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1a schematically presents an example of a gear set diagram of an automatic transmission 1 with six shifting elements A to F, whereas the shifting elements A and F are effectively positive-locking and the shifting elements B, C, D, and E are effectively frictional-locking. The frictional-locking shifting elements are also known as friction couplings, and the positive-locking shifting elements are also known as claw couplings or claw shifting elements. Thereby, the positive-locking shifting element A is formed as a coupling, i.e. a shiftable connection between two rotatable parts. In its closed state, the positive-locking shifting element F connects a shaft to the housing in a torque-proof manner, and is thus formed as a brake.

As can be seen from the table in FIG. 1b, nine possible transmission ratio stages "1" to "9," also designated as gears, are presented for forward travel, and one transmission ratio stage "R" is presented as a reverse gear of each of the three closed shifting elements. In the transmission ratio stages "1" to "4," the two claw shifting elements A and F are closed, such that, through the switching on of one of the four frictional-locking elements B, C, D, E, a frictional connection in the gears "1" to "4" is achieved. In order to move from one transmission ratio stage to the next, one shifting element is to be opened, and another shifting element is to be closed. Thus, for example, for the presentation of the fourth gear, or the transmission ratio stage "4," the shifting elements A, E and F must be closed. In order to effect a change from the transmission ratio stage "4" to the transmission ratio stage "3," the shifting element E is to be opened, and the shifting element B is to be closed. In doing so, the shifting elements A and F remain closed. In addition, there are transmission ratio stages that can be transferred into each other through the opening or closing of only one shifting element, such as, for example, the change of the transmission ratio stages "7" and "4" or "7" and "5."

The positive-locking shifting elements A or F are only closed if there is a change from a higher transmission ratio stage to a lower transmission ratio stage, such as, for example, from the transmission ratio stage "5" to the transmission ratio stage "4." Upon a change from a lower transmission ratio stage to a higher transmission ratio stage, the positive-locking shifting elements A or F are only open, such as, for example, from the transmission ratio stage "4" to the transmission ratio stage "5," or from the transmission ratio stage "7" to the transmission ratio stage "8."

However, if, upon a shift, one or more transmission ratio stages must be skipped, as this may be necessary, for example, upon a braking process with a significant deceleration, it is often the case that more than one shifting element (in the present example, two shifting elements) is to be opened or closed, as the case may be, between the output transmission ratio stage and the target transmission ratio stage. This is the case for shifts from the transmission ratio stage "9" or "8" to "1" or "6," from the transmission ratio stage "7" to "2" and "3," from the transmission ratio stage "6" to "3" and "1," and from the transmission ratio stage "5" to "2" and "1". For each downshift from the output transmission ratio stage "5", "6" or "7" to the transmission ratio stage "4" to "1", the positive-locking shifting element F is to be closed.

Such shifts must be divided into two changes to the transmission ratio stages, for which only one shifting element must be closed or open, as otherwise an interruption in the pulling force will arise. This is also known as a multiple shift.

If, upon a braking process, a downshift from an output transmission ratio stage to a first target transmission ratio stage is started, and, during the shift to be prepared of a shifting element to be closed, for example based on the speed gradients of the vehicle, it is recognized that an even deeper transmission ratio stage is to be engaged as a second target transmission ratio, an interlaced shift is carried out; i.e., the shifting element that is to be closed for the presentation of the second target transmission ratio stage is prepared for its switching on; i.e., it is pre-filled in a rapid filling phase and brought into the filling adjustment phase. Thereby, as described above, a significantly shorter shifting time is achieved compared to the multiple shift, which would also be feasible in such a case.

Figure 2A:
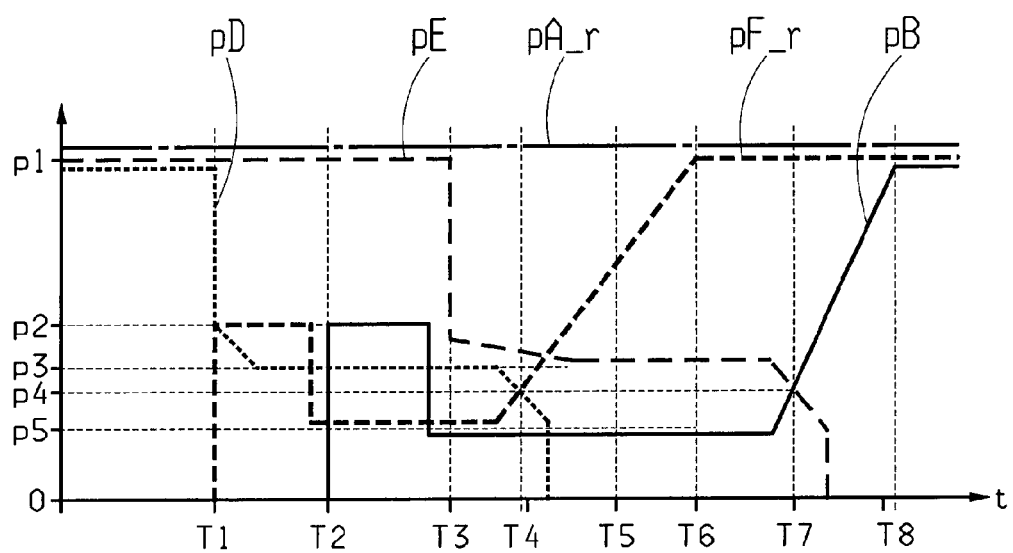
FIG. 2a the chronological progression of the shifting element pressures for an interlaced shift with frictional-locking shifting elements, according to the state of the art.

In FIG. 2a, starting from a transmission ratio stage "7," examples of the progressions of the pressures of the frictional-locking shifting elements A_r, B, D, E, and F_r are shown over time for an interlaced downshift according to the state of the art. In the state of the art, this method is disclosed only for frictional-locking shifting elements. The pressure gradients allocated to the shifting elements as a function of time are designated as pA_r, pB, pD, pE and pF_r.

At a point in time T0, the transmission ratio stage "7" is engaged. The pressures of the frictional-locking shifting elements A, D and E are at a closing pressure level p1, at which the maximum torque is able to be transferred without any slip.

In the examples, the closing pressure level and all pressure levels specified below are equal for all shifting elements, which is also theoretically possible. However, these can differ slightly in practice, since, depending on their design, the areas of the coupling pistons impacted by the coupling pressure may differ. The shifting element pressures in the diagrams in FIG. 2a-c, each found at the same pressure level are, for reasons of a clear presentation, distanced from each other in the direction of the p-axis, in particular at the closing pressure level.

At the point in time T1, a shifting command is issued, with which there is to be a shift from the output transmission ratio stage "7" to the target transmission ratio stage "4". For this purpose, as can be seen in FIG. 1b, the shifting element D is to be opened and the shifting element F_r is to be closed. The pressure pD and thus the transfer capacity of the shifting element D is, at the point in time T1, reduced in a spring-like manner, with a subsequent brief linear drop in pressure, to an intermediate pressure level p3. The transfer capacity at the intermediate pressure level is sufficient for a slip-afflicted transfer of torque, and enables an overlapping shift without an interruption in the pulling force. At the point in time T1, the shifting element F_r to be switched on for the representation of the transmission ratio stage "4" is prepared for its switching on, whereas the pressure pF_r is raised to a rapid filling pressure level p2 and held there until a point in time T2. From the point in time T2, the so-called "rapid filling phase" is followed by the so-called "filling adjustment phase," at the beginning of which the pressure pF_r is reduced to the filling adjustment pressure level p5 and held there as a constant. The pressures pE and pA_r remain at the closing pressure level p1, by which the shifting elements A and E remain closed. With the originally intended shift from the transmission ratio stage "7" to the transmission ratio stage "4," the shifting element E would remain closed during the entire shifting process, while, in accordance with the sequence of an overlapping shift, the shifting element F_r would be raised in its transfer capacity.

Figure 2B:
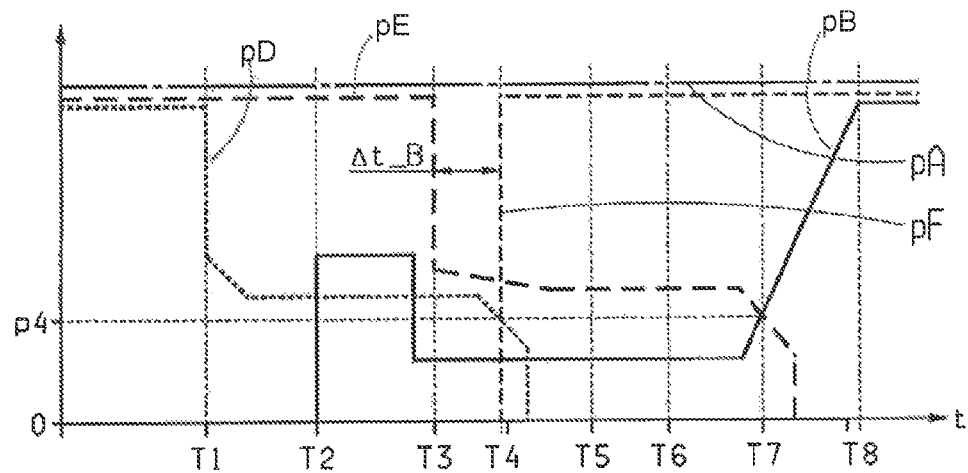
FIG. 2b the chronological progression of the shifting element pressures for an interlaced shift with frictional-locking shifting elements and one positive-locking shifting element, according to the state of the art and FIG. 2c the chronological progression of the shifting element pressures for an interlaced shift with frictional-locking shifting elements and one positive-locking shifting element, in accordance with the method under the invention.
Figure 2C:
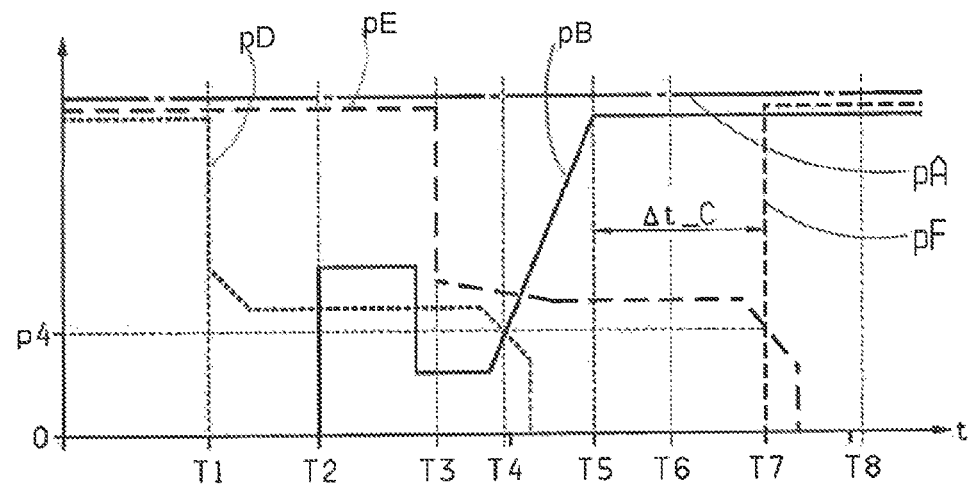

Since the shifting element A_r must be closed at both the transmission ratio stage "7" and the transmission ratio stages "4" and "3", the shifting element pressure pA_r remains at the closing pressure level p1 for the entire duration of the shift. Therefore, in this example, it is not material if this is formed as a positive-locking shifting element or a frictional-locking shifting element. In contrast to this, the shifting element F_r in FIG. 2a is formed as a frictional-locking shifting element, and in FIGS. 2b and 2c is formed as a positive-locking shifting element. Between the points in time T1 and T2, on the basis of a new request for a further downshift recognizable (for example) from the speed gradients, a shifting command for the engagement of the transmission ratio stage "3" in place of the transmission ratio stage "4" is issued. For the presentation of the transmission ratio stage "3," the shifting elements A, B and F_r must be closed, as shown in the table in FIG. 1b.

At the point in time T2, shortly after completion of the rapid filling phase of the shifting element F_r, the pressure pB, for the preparation of the shift from the transmission ratio stage "4" to the transmission ratio stage "3," is raised in a spring-like manner to the rapid filling pressure level p2, which starts the interlacing of the shift. Until shortly prior to the point in time T3, the pressure pB remains at the rapid filling pressure level p2. Since, for the presentation of the new target transmission ratio stage "3," the shifting element E must be closed, at the point in time T3, the pressure pE is reduced in a spring-like manner to the intermediate pressure level p3. At a point in time T4, the pressure pF_r linearly increasing as upon a shift of the transmission ratio stage "4" after the point in time T3 exceeds a takeover pressure level p4 at which the pressure pD is found, after which the transfer capacity of the shifting element F_r is further raised, and the pressure pD is reduced to zero.

A takeover pressure level is understood to be the pressure head in a hydraulic frictional-locking shifting element, with which the transfer capacity of a frictional-locking shifting element is raised to the extent that a torque is transferable, whereas the shifting element is not yet closed at this time, and the torque is transferred under slip; that is, there is a rotational speed difference between the two shifting element halves. With an overlapping shift, when the takeover pressure level is reached, the shifting element to be switched on takes over the torque from the shifting element reduced in its transfer capacity, such that no interruption in the pulling force occurs.

At the point in time T4, the shifting element D is fully opened. By the fact that, from the point in time T4, each of the pressures pE and pF_r is found at a pressure level at which at least one slip-afflicted transfer of torque is possible and the shifting element A_r is closed, an interruption in the pulling force is prevented.

At a point in time T6, after the end of its ramp-shaped rise, the pressure pF_r reaches the closing pressure level p1, by which the shifting element F_r is fully closed. In order to fully engage the transmission ratio stage "3," the pressure pB is raised between the points in time T6 and T7 in a ramp-shaped manner. At a point in time T7, this reaches the takeover pressure level p4 and subsequently exceeds the pressure pE, whereas the transfer capacity of the shifting element B is further increased.

Since, at the point in time T7, the shifting elements A_r and F_r are closed, and the shifting element B may transfer a torque in a manner afflicted with slip, the pressure pE is reduced to zero shortly after the point in time T7, and the shifting element E is thus fully opened. With three torque-transferring shifting elements, a further application of pressure of the shifting element E at the intermediate pressure level p3 would lead to the blocking of the automatic transmission. At a point in time T8, the shifting element B is fully closed, by which the transmission ratio stage "3" is engaged.

FIG. 2b shows the chronological progressions of the coupling pressures for an interlaced shift, at which, in contrast to the interlaced shift according to the state of the art described under FIG. 2a, the shifting element F is positive-locking and not frictional-locking. In the example of FIG. 2b, the shifting element A is now likewise positive-locking, but this has no effects on the described shifting process, since it remains closed for the entire duration of the shift.

As shown in the diagram of FIG. 2b, the transmission ratio stage "7" is engaged at the point in time T0. At the point in time T1, a shifting command to change to the transmission ratio stage "4" is issued, such that the pressure pD is reduced to the intermediate pressure level p3. Since, in contrast to FIG. 2, the shifting element F to be switched on is positive-locking and need not be prepared within the sense of a described hydraulic pre-filling, as with a frictional-locking shifting element. The reason for this is that, with a positive-locking shifting element, the transfer capacity may not be increased arbitrarily; rather, this can only occupy an open or a closed state. In this case, the positive-locking shifting element is closed upon an application of a specified pressure pF, and is opened in a pressure-free state, i.e., upon a pressure of zero. In principle, depending on the structural design of the positive-locking shifting element, this may also still be open upon a pressure that is greater than zero, as long as this pressure is below a minimum pressure necessary for the closing of the shifting element.

In principle, the increase in the shifting pressure for a positive-locking shifting element takes place in a spring-like manner. Based on the unnecessary hydraulic preparation and the steep, almost vertical pressure rise, the positive-locking shifting element F must be switched on at the point in time only if it is necessary to take over the torque of the shifting element D to be switched off, the pressure pD of which is still at an intermediate pressure level p3. This occurs at the point in time T4, when the pressure pD is lowered to zero. At the point in time T4, the positive-locking shifting elements A and F are closed, and the frictional-locking shifting element E transfers a torque in a slip-afflicted manner, such that no interruption in the pulling force takes place.

Shortly prior to the point in time T7, the filling adjustment phase of the shifting element B is completed. The shifting element B, required for the presentation of the target transmission ratio stage "3," is now increased in its transfer capacity through a ramp-shaped rise in the pressure pB, starting from its filling adjustment pressure level p5. At the point in time T7, this takes over the torque of the shifting element E to be switched off, and at the point in time T8 reaches the shifting pressure level p_max, by which the shifting elements A, B and F are closed, or the target transmission ratio stage "3" is engaged.

Even if a positive-locking shifting element does not require a hydraulic pre-filling, a different manner of preparation is required at its switching on. An engaging or switching on of a positive-locking shifting element is only possible if the rotational speed difference of its shifting element halves is in a specified range, as already described above.

In an automatic transmission under the present invention, the turbine rotational speed, i.e., the input rotational speed of the transmission, and the output rotational speed are measured at the transmission output. A determination of the differential rotational speed of the shifting element halves of a positive-locking shifting element is only possible with these two rotational speeds if the positive-locking shifting element is the only open shifting element of the shifting elements to be closed for the production of the frictional connection at the particular transmission ratio stage. The remaining shifting elements that are required for the presentation of the transmission ratio stage must be fully closed, since, upon its slip-afflicted transfer, there are several rotational speed differences in the transmission, and as such those of the positive-locking shifting element cannot be clearly calculated.

If all shifting elements, except for the positive-locking shifting element to be closed for the presentation of a transmission ratio stage, are closed, the differential rotational speed is calculated in a specified period of time. If this is in a permissible range below a specified upper limit, the positive-locking shifting element may be closed and thus switched on. If the differential rotational speed is outside this range, it must be guided into the permissible range, for example, by a positive engine control intervention and thus a change to the turbine rotational speed. Only at that point may the frictional-locking shifting element be engaged.

In the present example in FIG. 2b, two of the three shifting elements are fully closed before the positive-locking shifting element can be switched on. However, prior to the switching on of the shifting element F, the shifting element A is closed and the shifting element F is switched on only after the reduction of the pressure pE at the point in time T3. In the range of time $\Delta t\_B$ between the points of time T3 and T4, the shifting elements D and E transfer a torque, but work at the intermediate pressure level p3 in a slip-afflicted manner; that is, they themselves feature rotational speed differences. Thus, the differential rotational speed of the shifting element F cannot be calculated. An engagement without knowing it may have the consequence of the adverse effects described above, such that a switching on must be refrained from.

Thus, a simple replacement of the frictional-locking shifting element F_r with the positive-locking shifting element F upon the application of the method of an interlaced shift according to the state of the art has tremendous disadvantages, and is practically impossible.

The diagram in FIG. 2c shows a method, in accordance with the invention, of an interlaced shift with a positive-locking shifting element to be switched on. As shown in FIG. 2b, starting from the transmission ratio stage "7" to a shift into the transmission ratio stage "4," in contrast to the frictional-locking shifting element F_r in FIG. 2a, a hydraulic preparation of the positive-locking shifting element F at the point in time T1 is omitted. For the preparation of a shift into the target transmission ratio stage "3," as shown in the diagrams from FIGS. 2a and 2b, the shifting element B is prepared at the point in time T2, by the pressure pB being raised in a spring-like manner to the rapid filling pressure level p2. As shown in FIGS. 2a and 2b, the progressions of the shifting element pressures pD and pE are identical, as are the reduction in the shifting element pressure pB after its rapid filling phase, for instance at the point in time T4. If the transmission ratio stage "3" is determined to be a new target transmission ratio stage, which is already possible from the point in time T2, the shifting element pressure pB is raised in a ramp-shaped manner between the points in time T3 and T4. Shortly prior to the point in time T4, this reaches the takeover pressure level p4 and exceeds the shifting element pressure pD, which at the point in time T4 is reduced to zero and takes over its share of the transfer of power. At the point in time T5, the shifting element pressure pB reaches the closing pressure level p_max, by which, in addition to the shifting element A, the shifting element B is also now closed. From the point in time T5, a calculation of the differential rotational speed at the open positive-locking shifting element F is now possible. The shifting element pressure pE remains at the intermediate pressure level, in order to avoid an interruption in the pulling force. Within a time interval $\Delta t\_C$, after the calculation of a differential rotational speed, its adjustment to a permissible value by means of a positive engine control intervention (that is, increasing the engine rotational speed) is possible. The duration of the time interval Δt_C, and thus the shifting time, is determined by how quickly the rotational speed difference can be guided into a permissible range.

In the present example, this adjustment is completed at the point in time T7. The shifting element pressure pE is reduced to zero, and reaches the takeover pressure level p4 at the point in time T7, such that the positive-locking shifting element F can be switched on. Since the shifting element pressure pE is reduced to zero, a tensioning of the automatic transmission is avoided. The total shifting time for the interlaced shift had to be prolonged through the shortening of the filling adjustment phase for the shifting element B with the method in accordance with the invention. By the fact that the last shifting element to be switched on is positive-locking and may be engaged in a spring-like manner, the total shifting time, compared to frictional-locking shifting elements, theoretically may even be shortened.

Modifications and variations can be made to the embodiments illustrated or described herein without departing from the scope and spirit of the invention as set forth in the appended claims.

The invention claimed is:

1. A method for operating an automatic transmission having multiple shifting elements, including frictional-locking shifting elements and at least one positive-locking shifting element, and wherein for transmission ratios of the automatic transmission, at least three of the shifting elements are closed, the method comprising:
for a shifting process of specified ones of the transmission ratios that is less than all of the transmission ratios from a first transmission stage to a second transmission stage, opening two shifting elements and closing two other shifting elements including one of the positive-locking shifting elements; and
wherein the closing of the positive-locking shifting element takes place only after all frictional-locking shifting elements are closed that are needed to be closed for the second transmission stage.

2. The method as in claim 1, wherein the shifting process is a downshift.

3. The method as in claim 2, wherein the downshift between the first transmission stage and the second stage is conducted in two consecutive interlaced downshifts;
whereas the multiple shifting elements of the automatic transmission comprises six shifting elements, and a maximum of three of the six shifting elements are closed in each of the transmission ratios of the automatic transmission;
the method further comprising:
executing the two consecutive interlaced downshifts from a current transmission ratio to a first downshift, and from the first downshift to a second, downshift;
to shift from the current transmission ratio of the automatic transmission to a target transmission ratio of the second downshift, a first and a second shifting element of the six shifting elements are opened, and a third and a fourth shifting element of the six shifting elements are closed, wherein the third shifting element is a positive-locking shifting element that is closed in the first downshift and the fourth shifting element is a frictional-locking shifting element that is prepared for shifting during the first downshift so that upon reaching a synchronization point during the first downshift, the second downshift is immediately conducted; and
to achieve a target transmission ratio of the second downshift from the first downshift, the fourth shifting element is initially closed and a differential rotational speed is determined between halves of the third shifting element, wherein the third shifting element is closed upon the differential rotational speed coming within a specified permissible value.

4. The method as in claim 3, wherein the differential rotational speed is brought to the specified permissible value through positive engine control of a motor vehicle in which the transmission is installed.

5. The method as in claim 3, further comprising defining a specified time value between a point in time when the fourth shifting element is closed and the beginning of closing of the third shifting element, the specified time value having a length such that the differential rotational speed of the two halves of the third shifting element can be determined and the rotational speed value can be brought to the specified permissible value.

6. The method as in claim 1, wherein at least two adjacent transmission ratios are between the first transmission stage and the second transmission stage.

7. The method as in claim 6, wherein for changing between any two adjacent transmission ratios, only one shifting element is opened and one other shifting element is closed.

* * * * *